United States Patent
Moya et al.

(10) Patent No.: US 8,107,714 B2
(45) Date of Patent: Jan. 31, 2012

(54) METHODS FOR DETECTING AND TAGGING SCENE CHANGES

(75) Inventors: John Moya, El Paso, TX (US); David Saenz, Cuauhtemoc Chih (MX); Victor De La Garza, El Paso, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 1460 days.

(21) Appl. No.: 11/334,040

(22) Filed: Jan. 18, 2006

(65) Prior Publication Data

US 2006/0244827 A1  Nov. 2, 2006

Related U.S. Application Data

(60) Provisional application No. 60/644,792, filed on Jan. 18, 2005.

(51) Int. Cl.
*G06K 9/00* (2006.01)
*H04N 7/18* (2006.01)

(52) U.S. Cl. ........ 382/141; 382/144; 382/145; 348/129; 348/130

(58) Field of Classification Search .................. 348/141, 348/129, 130; 382/141
See application file for complete search history.

(56) References Cited

U.S. PATENT DOCUMENTS

| | | | | |
|---|---|---|---|---|
| 4,707,734 | A | * | 11/1987 | Labinger et al. ............. 382/149 |
| 5,760,893 | A | | 6/1998 | Raymond ................... 356/237.1 |
| 6,630,998 | B1 | * | 10/2003 | Welchman et al. ........... 356/394 |
| 2002/0196965 | A1 | * | 12/2002 | Wallace et al. ............... 382/131 |
| 2003/0059101 | A1 | * | 3/2003 | Safaee-Rad et al. .......... 382/141 |
| 2003/0095147 | A1 | * | 5/2003 | Daw .............................. 345/771 |

OTHER PUBLICATIONS

"Agilent Medalist SJ60 Series II" Product Data Sheet, *Agilent Technologies*, http://www.home.agilent.com/upload/cm_upload/All/59889938EN.pdf.
"Dragon S" Product Description, *Camtek Intelligent Imaging*, http://www.camtek.co.il/php/content/view/65/125.
Bahler et al., "Field Test of Nonintrusive Traffic Detection Technologies," *Transport. Res. Record*, No. 1643, 1998, 161-170, TE7 .H5 No. 1641-1645 1998.
Baras et al., "Estimation of traffic platoon structure from headway statistics," *IEEE Transactions on Automatic Control*, AC-24(4):553-559, 1979.
Beersma et al, "Retinal lattice, visual field and binocularities in flies: Dependence on species and sex," *J. Comp. Physiol.*, 119:207-220, 1977.
Besl et al., "Automatic visual solder joint inspection," *IEEE Journal of Robotics and Automation*, 1:42-56, 1985.
Braitenberg, "Patterns of projections in the visual system of the fly. I. Retina-lamina projections," *Exp. Brain Res*, 3:271-298, 1967.
Bullock et al., "A neural network for image-based vehicle detection," *Transpn. Res.-C.*, 1:235-247, 1993.

(Continued)

*Primary Examiner* — Nelson D. Hernández Hernández
*Assistant Examiner* — Chia-Wei A Chen
(74) *Attorney, Agent, or Firm* — Fulbright & Jaworski

(57) ABSTRACT

Methods for determining a difference between a reference scene and a test scene are provided. An automated process calculates a power of the reference scene and a power of the test scene. The difference between the power of the reference scene and the test scene determines whether there is a variance between the reference scene and the test scene. Variance can be reported to allow further evaluation of the test scene. For example, if the difference exceeds a threshold, the automated process may provide the test scene to a human inspector for further evaluation. Alternatively, the test scene may be provided to a computer for further evaluation.

23 Claims, 6 Drawing Sheets

OTHER PUBLICATIONS

Capson and Eng, "A tiered-color illumination approach for inspection of solder joints," *IEEE Transaction on Pattern Analysis and Machine Intelligence*, 10:387-393, 1988.

Chen et al., "Learning-based spatio-temporal vehicle tracking and indexing for transportation multimedia database systems, " *IEEE Transactions on Intelligent Transportation Systems*, 4(3):154-167, 2003.

Chen et al., "Traffic monitoring using digital sound field mapping," *IEEE Transactions on Vehicular Technology*, 50(6):1582-1589, 2001.

Dailey et al., "An algorithm to estimate mean traffic speed using uncalibrated cameras," *IEEE Transactions on Intelligent Transportation Systems*, 1(2):98-107, 2000.

Darwish and Jain, "A rule based approach for visual pattern inspection," *IEEE Transactions on Pattern Analysis and Machine Intelligence*, 10:56-68, 1988.

Di Mauro et al, "Check! a generic and specific industrial inspection tool," *IEE Proceedings-Vision, Image and Signal Processing*, 143:241-249, 1996.

Donlagić and Hanć, "A simple fiber-optic vehicle axle detector for roadways," *IEEE Transactions on Vehicular Technology*, 52:401-405, 2003.

Driels and Nolan, "Automatic defect classification of printed wiring board solder joints," *IEEE Transactions on Components, Hybrids, and Manufacturing Technology*, 13:331-340, 1990.

Edwards, "Machine vision and its integration with CIM systems in the electronics manufacturing industry," *Computer-Aided Engineering Journal*, 12-18, 1990.

Fürstenau et al., "Extrinsic fabry-perot interferometer fiber-optic microphone," *IEEE Transactions on Instrumentation and Measurement*, 47(1):138-142, 1998.

Hara et al., "A system for PCB automated inspection using fluorescent light," *IEEE Transactions on Pattern Analysis and Machine Intelligence*, 10:69-78, 1988.

Harrison and Weir, "High-speed triangulation-based 3-D imaging with orthonormal data projections and error detection," *IEEE Transaction on Pattern Analysis and Machine Intelligence*, 12:409-416, 1990.

Horowitz and Varaiya, "Control design of an automated highway system," *Proceedings of the IEEE*, 88:913-925, 2000.

Hussain et al., "Infrared Pyroelectric seensor for detection of vehicular traffic using digital signal processing techniques," *IEEE Transactions on Vehicular Technology*, 44(3):683-689, 1995.

Hussain at al., "Overhead infrared sensor for monitoring vehicular traffic," *IEEE Transactions on Vehicular Technology*, 42(4):477-483, 1993.

Ji and Leu, "Design of optical triangulation devices," *Optics and Laser Technology*, 21:335-338, 1989.

Kim et al. "Ultrasonic vehicle detector for side-fire implementation and extensive results including harsh conditions," *IEEE Transactions on Intelligent Transportation Systems*, 2(3):127-134, 2001.

Kirshfeld, "Die Projektion der optischen Umwelt auf das Raster der Rhabdomere im Komplexauge von Musca," *Exp. Brain Res*, 3:248-270, 1967.

Ko and Cho, "Solder joints inspection using a neural network and fuzzy rule-based classification method," *IEEE Transactions on Components Packaging Manufacturing*, 23:93-103, 2000.

Lathrop, "Solder paste print qualification using laser triangulation," *IEEE Transactions on Components, Packaging and Manufacturing Technology, Part C*, 20:174-182, 1991.

Laughlin and Hardie, "Common strategies for light adaptation in the peripheral visual systems of fly and dragonfly," *J Comp. Physiol*, 128:319-340, 1978.

Loh and Lu, "Printed circuit board inspection using image analysis", *IEEE Transactions on Industry Applications*, 35:426-432, 1999.

Masoud and Papanikolopoulos, "A novel method for tracking and counting pedestrians in real-time using a single camera." *IEEE Transactions on Vehicular Technology*, 50:1267-1278, 2001.

Michalopoulos, Panos G., Vehicle detection video through image processing: the autoscope system, *IEEE Transactions on Vehicular Technology*, 40:21-29, 1991.

Mkaouar and Lepage, "Extraction of characteristics from an image by analysis with multiple spatial resolutions," *Canadian Conference on Electrical and Computer Engineering*, 2:1176-1179, 1995.

Moganti and Ercal, "Automatic PCB inspection systems," *IEEE Potentials*, 14:6-10, 1995.

Moya and Sáenz, "Biologically-inspired multi-object tracking algorithm applied to traffic monitoring,"Paper Presented at WSEAS/IASME Conference on Computational Intelligence, Man-Machine Systems and Cybernetics, Miami Lakes,FL, Nov. 2005.

Moya and Sáenz, "Vehicular traffic monitoring via a biologically-inspired approach." *WSEAS Transactions on Signal Processing*, 3:385-391, 2005.

Olson et al., "Active-infrared overhead vehicle sensor," *IEEE Transactions on Vehicular Technology*, 43(1):79-85, 1994.

Ouslim and Curtis, "Automatic visual inspection based upon a variant of the n-tuple technique," *IEE Proceedings- Vision, Image and Signal Processing*, 143:301-309, 1996.

Patel and Whitehouse, "Keeping an electronic eye on the road," *IEEE Computer Graphics and Applications*, 1:16-17, 1995.

Ries, Comparing statistical appearance modeling™ (SAM) to traditional automated optical inspection (AOI), *Cyberoptics*, 1-7, 2001.

Ries, "New advances in AOI technologies," *SMT*, 1:62-66, 2001.

Ryu and Cho, "A neural network approach to extended Gaussian image based solder joint inspection," *Mechatronics*, 7:159-184, 1997.

Sénz and Moya, "Just-enough-smart sensing applied to printed circuit board inspection," *IEEE Transactions on Automation Science and Engineering*, Submitted Mar. 15, 2005 (unpublished).

Sáenz-Zamarrón, "Just-Enough-Smart Position Sensing (Jesse) System" *Dissertation Presented to the Faculty of the Graduate School of the University of Texas at El Paso*, Dec. 2005.

Scarzello et al., "SPVD: a magnetic vehicle detection system using a low power magnetometer," *IEEE Transactions on Magnetics*, Mag-14(5):574-576, 1978.

Scholes, "The elctrical responses of the retinal receptors and the lamina in the visual system of the fly Musca", *Kybernetik*, 6:149-162, 1969.

Seaton and Abbott, "Comparison of multiresolution morphological and Laplacian techniques for automated inspection", *Proceeding of SPIE—The International Society for Optical Engineering*, 1708:789-800, 1992.

Setchell and Dagless, "Vision-based road-traffic monitoring sensor, " *IEE Proc. Vis. Image Signal Process.*, 148:78-84, 2001.

Smakman et al., "Angular sesitivity of blowfly photoreceptors: intracellular measurements and wave-optical predictions", *J. Comp. Physiol*, 155:239-247, 1984.

Smith, et al., "Visual tracking for intelligent vehicle-highway systems," *IEEE Transactions on Vehicular Technology*,45(4):744-759, 1996.

Snyder et al., "Circuit board inspection using a range camera", *IEEE Transactions on Industrial Electronics*, 38:142-149, 1991.

Stevens, "Evolution to an Automated Highway System,"*Automated Highway Systems*, P. A. Ioannou, Ed., Plenum, NY, 1997.

Strausfeld and Campos-Ortega, "Vision in insects: pathways possibly underlying neural adaptation and lateral inhibition," *Science*, 195:894-897, 1977.

Uchiyama et al., "Car traffic monitoring system using MI sensor built-in disk set on the road," *IEEE Transactions on Magnetics*, 36:3670-3672, 2000.

Veeraraghavan et al., Computer vision algorithms for intersection monitoring, *IEEE Transactions on Intelligent Transportation Systems*, 4(2):78-89, 2003.

Wehrhahn, "Sex-specific differences in the chasing behavior of houseflies (Musca)," *Biol. Cyber*, 32:239-241, 1979.

Zuech, "Machine vision in the assembled printed circuit board market—Part 1," http://www.machinevisiononline.org/public/articles/arch.

* cited by examiner

METHODS FOR DETECTING AND TAGGING SCENE CHANGES

This application claims priority to, and incorporates by reference, U.S. Provisional Patent Application Ser. No. 60/644,792, which was filed on Jan. 18, 2005.

BACKGROUND OF THE INVENTION

1. Field of the Invention

The present invention relates generally to surveillance, and more particularly to an apparatus and method for detecting and tagging changes in a scene captured by a camera or a similar sensing device.

2. Description of Related Art

Visual surveillance is an integral task in many fields, including, but not limited to, manufacturing quality inspection, monitoring of vehicles or other objects on or near a road from a distance point not within the vehicle or from a moving vehicle, security monitoring of parking lots and entrance points to a buildings, medical monitoring of changes to a surface or image (e.g., x-ray images, images of the skin, etc.), environmental monitoring of changes to a surface or image (e.g., remote or aerial views of terrestrial landscape), monitoring of objects in the air, sky or outer space, and other similar tasks. While it may be sufficient in some cases to perform sample surveillance or inspection, where only a portion of the images of an area or location or a subset of objects is examined, in others, such as inspection of manufactured printed circuit boards, a sample inspection is not desirable. Further, in some cases, a human inspection process can be labor-intensive and time consuming. As such, automated surveillance or inspection techniques are desirable.

Automated surveillance approaches can include either referential or non-referential techniques. Referential surveillance includes the use of template or model matching while non-referential approaches include rule-based or morphological techniques. Both of these techniques can be computational intensive, can require significant time to setup, and can suffer from problems such as lighting and material variations. The usefulness of non-referential techniques also depends on the development of a sufficient number of rules to check for inconsistencies. Special image acquisition techniques and various post-processing tools have been developed to assist the automated surveillance process. For instance, special lighting or range camera methods may be able to selectively acquire information. Further, scale-space approaches and contour maps as well as pattern recognition techniques and neural networks can improve the processing of acquired images. However, in many cases, the complexity of the surveillance task and speed of computation is still an issue.

The referenced shortcomings are not intended to be exhaustive, but rather are among many that tend to impair the effectiveness of previously known techniques concerning detecting errors or changes in a scene; however, those mentioned here are sufficient to demonstrate that the methodologies appearing in the art have not been satisfactory and that a significant need exists for the techniques described and claimed in this disclosure.

SUMMARY OF THE INVENTION

The present disclosure involves using an automated approach with human or algorithmic assistance for surveillance and detecting changes at a target area. The automated inspection algorithm can serve as a "heads-up" system for a human inspector or another algorithm. In this way, the present disclosure may provide operations that are most effectively done by a machine and may identify problem areas that are more easily assessed by humans or a visual system.

In one respect, the present disclosure involves a method. The method provides steps for selecting a reference scene and a testing scene. The method also provides steps for determining a power contained in the reference scene and for determining a power of the testing scene. The difference between the powers determines a variance between the reference scene and the testing scene.

In one embodiment, the reference scene includes manufactured product such as, but not limited to, a printed circuit board. Alternatively, the reference scene include an image of an area for monitoring, including, without limitation, a traffic bridge, a road, a building, a parking lot, a terrestrial area, an area of a sky, an area of an air space, an area of an outer space, or an area of a body, or other areas needing monitoring and/or tracking.

In other respects, the present disclosure involves a method for determining a difference between a reference scene and a testing scene. The method provides a processor configured to receive a reference scene and a testing scene. The processor calculates a power of the reference scene and the testing scene and determines the difference between the powers. Upon determining the difference, the processor is configured to determine if the difference exceeds a threshold. If the difference exceeds the threshold, the testing scene can be further analyzed, for example, via human assessment or computer analysis for determining the significance of the difference between the testing scene and the reference scene. In one embodiment, the processor can be configured to provide a pointer to the difference between the testing scene and the reference scene.

As used in this disclosure, "algorithm" should be interpreted according to its plain meaning as understood by those having ordinary skill in the art. As is known in the art, algorithms can be embodied in computer software. For example, an algorithm may be embodied in any computer language or script as a stand-alone program or as a sub-component of software such as a sub-routine. The software can be embodied on any computer readable media known in the art such as, but not limited to, a CD, a disk, a tape, FLASH memory, a hard drive, etc. As is known in the art, an algorithm may also be embodied as firmware in an integrated circuit or chip. Algorithms may be utilized or executed by computing devices known in the art such as but not limited to a personal computer, a server, a mainframe, a personal digital assistant (PDA), etc.

The term "coupled" is defined as connected, although not necessarily directly, and not necessarily mechanically.

The terms "a" and "an" are defined as one or more unless this disclosure explicitly requires otherwise.

The term "substantially," "about," and it's variations are defined as being largely but not necessarily wholly what is specified as understood by one of ordinary skill in the art, and in one-non and in one non-limiting embodiment the substantially refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
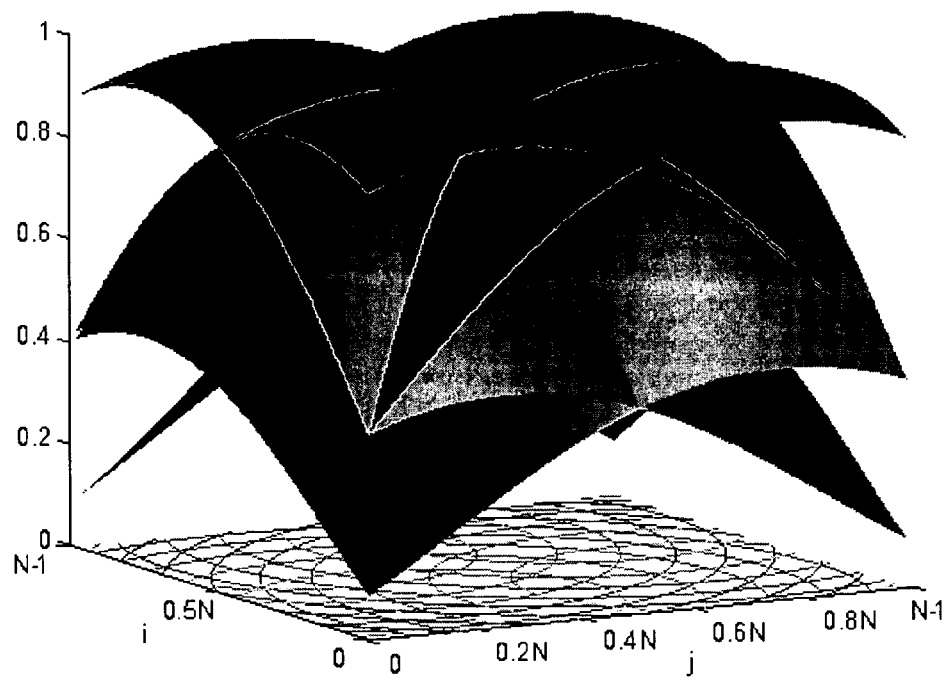
FIG. 1 shows four non-concentric filters displaced diagonally on an area, in accordance to embodiments of the present disclosure.

The invention and the various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Detection of newly introduced objects, missing objects or object misplacement may be similar to the tracking problem solved by flies. Further, since the tracking maneuvers of flies must be carried out in nature at high speed and with possibly changing backgrounds, the use of a surveillance algorithm suggested by this insect may likely be fast and easily adjusted to scene and lighting changes.

The basic visual component in the compound eye of the fly is a neuro-ommatidium. The neuro-ommatidial structure is a columnar element with a distributed set of lenses and a photoreceptor array, each photoreceptor possessing a Gaussian-shaped angular sensitivity function. In flies, such as the common housefly, there are between 3000 and 4000 neuro-ommatidia per eye. The neuro-ommatidial layer is followed by the lamina, where a subtractive mechanism removes the effects of the average (or background) illumination. The lamina photoreceptors in each neuro-ommatidium also pass information along to three cells, known as the large monopolars, which conduct information to cells further in the fly's vision system. Utilizing a simplified version of the general concepts in the fly's neuro-ommatidium, an algorithm, described below, may serve as the "neuro-ommatidium" for a human-machine hybrid inspection method, or more generally for a surveillance method.

The Algorithm

In a one dimensional space, a point-wise multiplication of a pair of non-concentric Gaussian functions with a unit impulse function produces a non-zero product pair that may identify the position of an impulse with respect to the two Gaussians. By extension, the position of a point source in a two-dimensional space can be determined relative to three non-concentric Gaussian functions. Further, with at least three channels of information, a two-dimensional position can be determined using triangulation. Then by analogy to a fly's eye, a surveillance algorithm, a "neuro-ommatidium" algorithm, may be created for the assessment of changes to a surface by passing visual information gathered from that surface through at least three convex, non-concentric, monotonically-decreasing filters with a subtractive background illumination adjustment. For symmetry purposes, the algorithm that follows may use an even number of filters, such as four filters, six filters, eight filters, and the like. Alternatively, odd number of filters may be used.

Consider a sequence of images of a particular surface $f(i,j,t_0), f(i,j,t_1), \ldots, f(i,j,t_K)$ and let $f(i,j,t_0)$ be a reference image and $f(i,j,t_1)$ to $f(i,j,t_K)$ be images that possibly contain changes from the reference scene. Although the algorithm does not necessarily require it, without loss of generality, let the sequence of images be assumed to be digitized images of size N×N. The total power of an image $f(i,j,t_k)$ may then given by $$P_T(t_k) = \sum_{i=0}^{N-1} \sum_{j=0}^{N-1} [f(i, j, t_k)]^2 \qquad \text{Eq. 1}$$

Similarly, given four non-concentric filters $\{h_m(i,j)\}$ distributed symmetrically along the diagonals of an N×N area as shown in FIG. 1, where m=1 to 4, the power resulting via a point-wise multiplication of an image $f(i,j,t_k)$ by each $h_m(i,j)$ may be determined by $$P_m(t_k) = \sum_{i=0}^{N-1} \sum_{j=0}^{N-1} [h_m(i, j)f(i, j, t_k)]^2 \qquad \text{Eq. 2}$$

Figure 2:
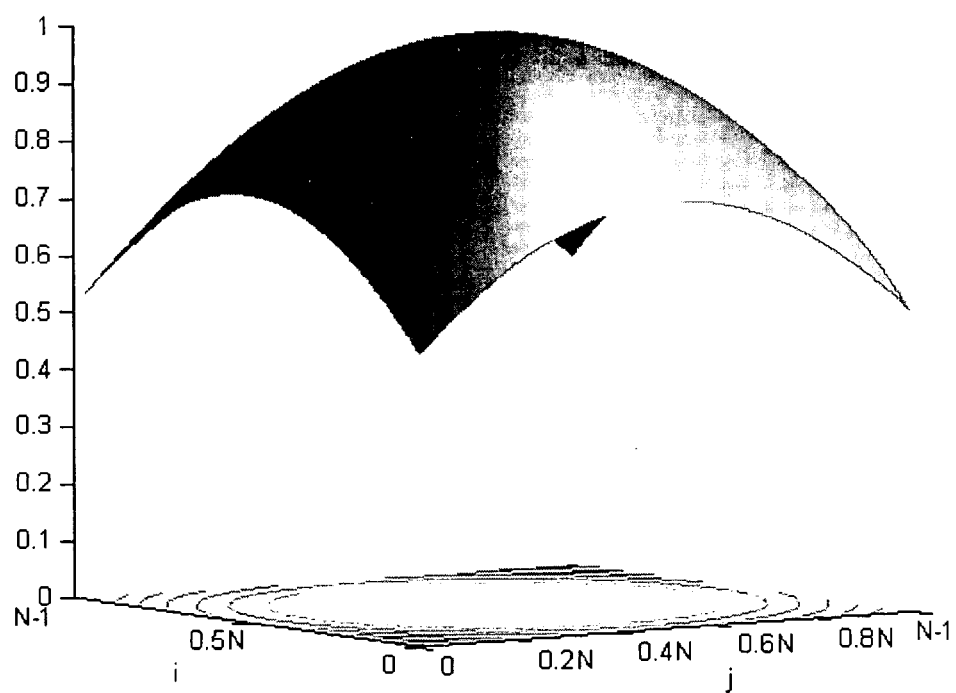
FIG. 2 is a Gaussian-like filter, in accordance to embodiments of the present disclosure.

In some embodiments, various smooth functions may be used to generate $h_m(i,j)$. In other embodiments, each function $h_m$ (i,j) may be a shifted version of the Gaussian-approximating function $$h(i,j) = 1 - \sin\left(\left(\frac{i-\frac{N}{2}}{C}\right)^2 + \left(\frac{j-\frac{N}{2}}{C}\right)^2\right) \quad \text{Eq. 3}$$

evaluated from 0 to N−1 for both i and j, as seen in FIG. 2, where C is a scaling constant that allows one to alter the width of h(i,j) and thus also of each of the four functions $\{h_m(i,j)\}$. In the latter embodiments, note that C may be selected such that a monotonically decreasing $h_m(i,j)$ with nonzero values over an entire N×N area may be generated.

Figure 3:
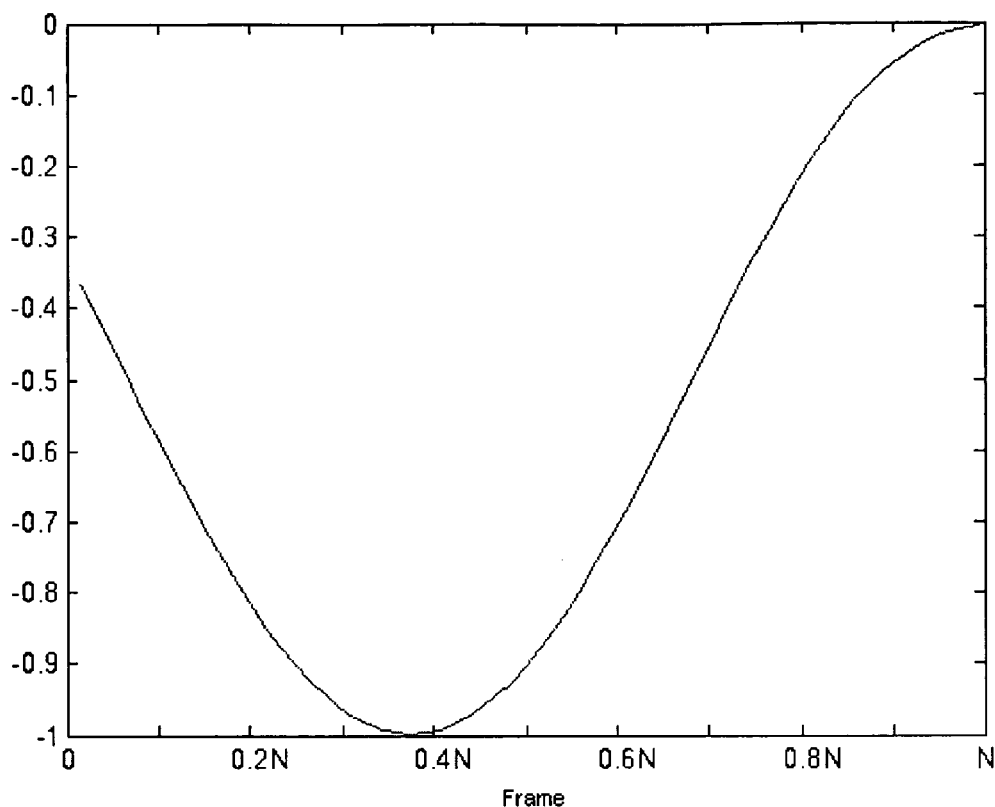
FIG. 3 is a power loss curve, in accordance to embodiments of the present disclosure.

In one embodiment, suppose that K=N in the above K+1 frame sequence and that $f(i,j,t_0)$ contains a homogeneous background of unit intensity, with the rest of the N frames containing exactly the same, except for a single zero-intensity pixel object which lies on the diagonal of the N×N scene. Additionally, suppose that the zero-intensity pixel moves diagonally a pixel per time step from top-left to bottom-right across the N×N scene from frame 1 through frame N. Then if Eq. 2 is evaluated for each frame, a power loss curve, such as the curve of FIG. 3, may be obtained. Referring to FIG. 3, the movement of the zero-intensity pixel away from the center of $h_m(i,j)$ causes the filter to respond with the increase given by a sinusoidal-like function. The curve follows the sinusoidal curve enforced by Eq. 3, and such a function may relate the total power lost and the relative position of the object in the scene with respect to the center of $h_m(i,j)$. By extension, similar curves may be created for various objects that could cross in any direction through the center of $h_m(i,j)$.

In another embodiment, consider the situation where the power given by Eq. 2 is known with respect to $h_m(i,j)$ for a particular frame n in a similar moving object N+1 frame sequence and that the position of the moving object (which in this case is of unknown size) with respect to the center of $h_m(i,j)$ is desired. Due to the circular symmetry of Eq. 3, a large number of possible positions, all along the circumference of a circle with radius $R_m(t_n)$, may be associated with the object. Further, $R_m(t_n)$ may be calculated via the inverse of a function like that presented in FIG. 3, with the latter inverse function given by $$R_m(t_n) = \left|(1-u_m)\left(1 - \frac{1}{\pi}\cos^{-1}\left(1 - \frac{2y_m(t_n)}{A(t_n)}\right)\right)\right| \quad \text{Eq. 4}$$

Where $A(t_n)$ is the amplitude associated with the power loss curve, $u_m$ is the shortest normalized diagonal distance from a corner in an N×N image area to the center of $h_m(i,j)$ and $y_m(t_n)$ is the absolute change in the power received by $h_m(i,j)$, where $y_m(t_n)$ is given by $$y_m(t_n) = |P_m(t_n) - P_m(t_0)|, \quad \text{Eq. 5}$$

In one embodiment, it may be reasonable to assume that $A(t_n)$ is related to the size of a moving object. Observing that the size of a moving object in the viewed scene may generally be associated with changes in the power received via Eq. 1, and as such, a function based on Eq. 1 may be relevant. Based on the latter, when an object with reasonable contrast is introduced into a scene, the function $$A(t_n) = \frac{P_T(t_n)|P_T(t_n) - P_T(t_0)|}{P_T(t_0)} \quad \text{Eq. 6}$$

may be satisfactory.

Figure 4:
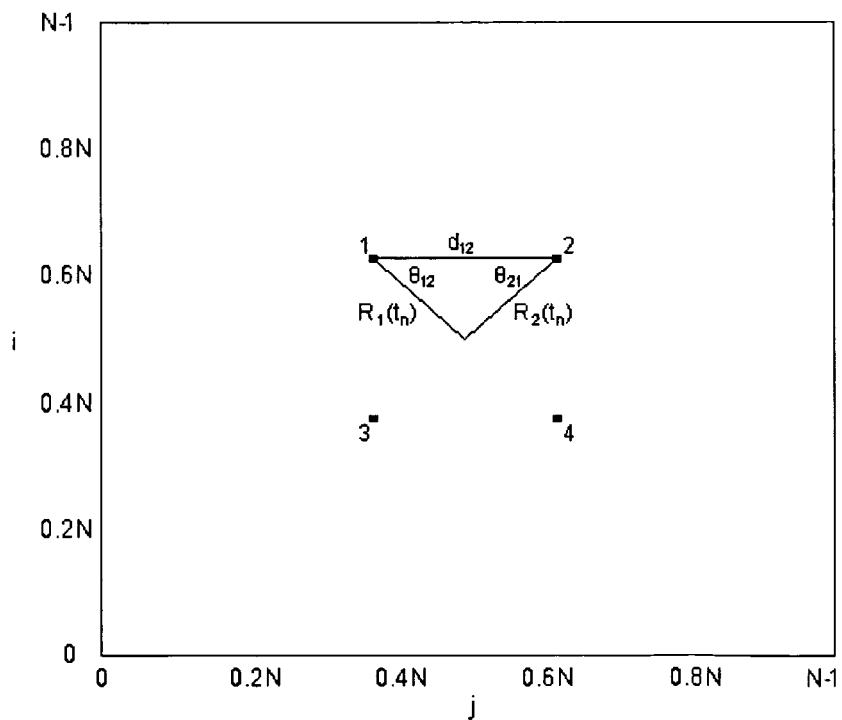
FIG. 4 is a triangle associated with a possible position of a detected object, in accordance to embodiments of the present disclosure.

As shown in FIG. 4, given the distance between adjacent filter $h_m(i,j)$ centers (e.g., $d_{12}$) and the four radii $\{R_m(t_n)\}$, triangles associated with the twelve possible locations of an object may be derived. Further, via application of the Law of Cosines, the twelve angles $\{\theta(t_n)\}$ associated with the vectors to the possible locations of an object may be determined. Referring to FIG. 4, two of the angles, $\theta_{12}$ and $\theta_{21}$, in the latter set are shown. Under ideal, continuous, binary conditions with a single object changing positions in a scene, six of the possible locations may closely overlap and these points may give the location of the object. In non-binary, complex, digitized images, the overlap between possible locations may decrease. However, the average of the six closest points may represent a reasonable estimate of the location of a moving object.

Figure 5:
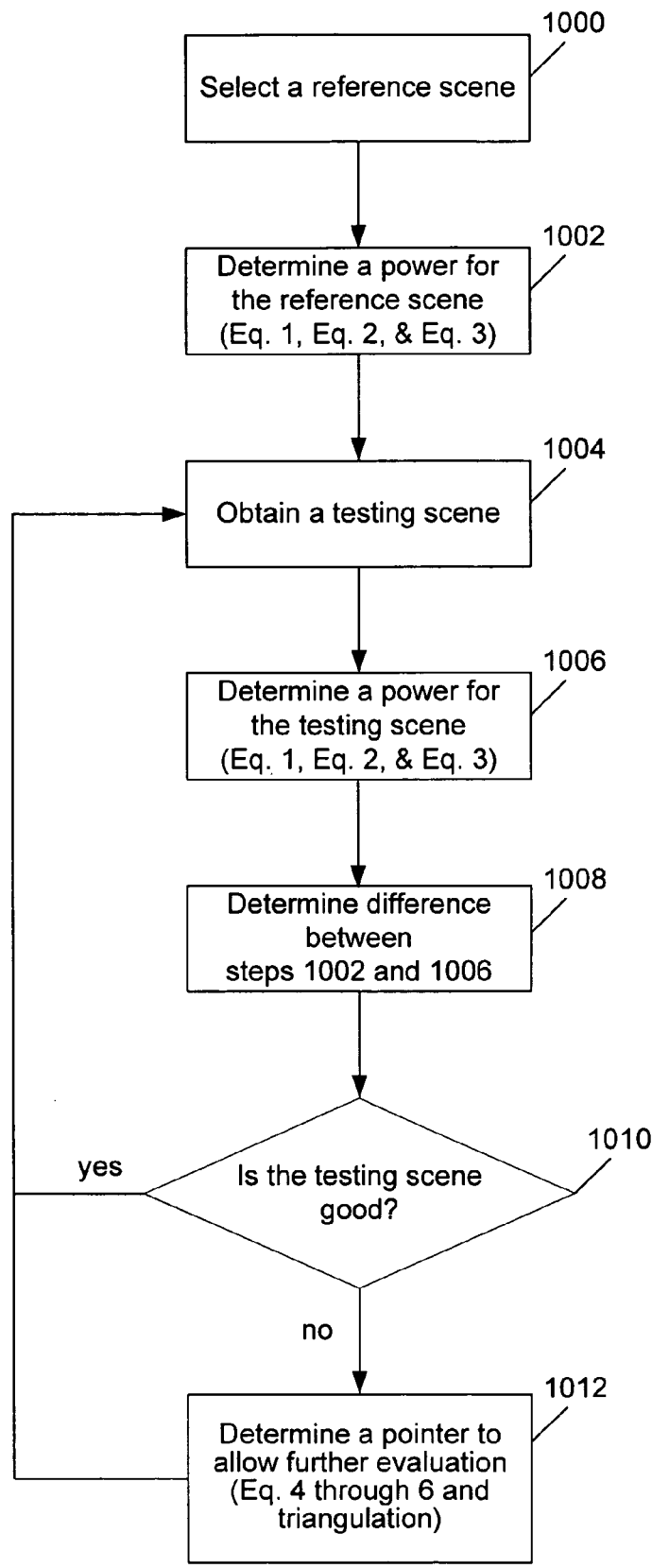
FIG. 5 is a flow chart illustrating a method, in accordance to embodiments of the present disclosure.

Referring to FIG. 5, a flow chart illustrating a method of the present disclosure is shown. In step 1000, a reference scene is chosen, and in step 1004, a testing scene is acquired. The reference sample may be a fixed scene, such as an image of an area to monitor objects passing. For security monitoring, the area may be an entrance point to a home or business. Alternatively, the area may be a parking lot. For tracking purposes, the area may be a geological point, including an area of the sky, air space, open fields, terrestrial area, outer space, etc. For monitoring traffic conditions, the area may be an intersection, a portion of a highway, a bridge, a road, and the like. The testing scene for security monitoring, tracking purposes, or monitoring traffic may be from the same viewing location as that for the reference scene, but taken at a later time.

Alternatively, the scene may also be a tangible object, such as a printed circuit board or any manufactured product. The testing scenes for these tangible objects are similar objects that need to be tested. The reference scene may be used as a guidance to determine the quality of the testing scene Further, the reference scene may be an area of skin, an area of the body, or images from a body, where similar scenes (e.g., the testing scenes) obtained at later in time may be tested for changes that may indicate disease.

In step 1002, the power of the reference scene is determined using, for example, Eq. 1, Eq. 2, and/or Eq. 3. Next, as shown in step 1006, the power of the testing scene is determine by applying, for example, Eq. 1, Eq. 2, and/or Eq. 3.

In step 1008, the difference between step 1002 and step 1006 is determined. In step 1010, if the power values differ by less than some set of comparison thresholds $\{\beta\}$ then the testing sample represents a test sample that is similar to the reference sample. For the cases of security or traffic monitoring, or in general during object tracking, this may indicate that the scene is consistent with no objects being introduced or moved in the scene, or at least, that any objects that may have been moved or introduced are of insignificant size relative to the size of the overall scene.

When the reference and testing scenes are of a tangible object (e.g., a printed circuit board), a portion of the body, or a part of the skin, this may indicate that the test sample is a "good" test sample. In other words, the scene may contain only minor or insignificant visible defects. Further, if the power values differ by some proportional value, the testing sample may represent a similarly "good" test sample or a scene with insignificant changes, but one where the illumination conditions or surface background may have changed approximately uniformly.

If the testing sample is determine to contain only insignificant changes, the method continues to test other testing samples (repeating steps 1004, 1006, 1008, and 1010). Alternatively, if the power values differ by at least one of comparison thresholds $\{\beta\}$ as tested in step 1008, then the testing sample may represent a potentially "bad" test sample, or a scene with significant changes, that may require further assessment, possibly via human inspector evaluation. Utilizing Eq. 4 through Eq. 6 and triangulation, a pointer to the area that contains the possible fault or change may be derived and displayed for further evaluation including, without limitation, human inspection or other computer analysis (step 1012). In some embodiments, the method may continue to test another testing sample (repeats steps 1004, 1006, 1008, and 1010).

In some embodiments, it may be possible to periodically restart the algorithm shown in FIG. 5 to locate multiple changes introduced sequentially into test scenes over time. In other embodiments, it may be possible to predict the power change expected due to past changes in the test scene over time. As such, it may be possible to utilize a prediction to periodically update the reference power first obtained in step 1002 of FIG. 5 such that multiple new unexpected changes introduced sequentially over time may be located using steps 1004 through 1012 of FIG. 5.

In other embodiments, with possible periodic restart of the algorithm of FIG. 5, objects in a test scene may be located over time in scenes lacking a fixed background, including cases where test scene acquired in step 1004 is derived via a camera or sensing device on a moving platform, such as a robot or vehicle. As such, objects in the test scene may be still or may be in motion.

Multiple test scene changes or objects introduced sequentially or otherwise in scenes with fixed or changing backgrounds may be located via an arrayed version of the processes described above. In such embodiments, scene power may be derived via a multiplicity of non-concentric monotonically-decreasing filters (e.g., three or more filters). In one embodiment, this filter array may be created using any number of quad filter elements of the form in FIG. 1, where each quad filter element in the array may share two of its four filters in one of its columns or rows with each of its neighboring array elements. The algorithm given in FIG. 5 may then be executed over the sensing area of each element in the array. Given the likelihood of multiple array elements detecting a single scene change or object, redundancies may need to be removed. Such redundancies may be eliminated via a clustering technique or similar methods.

The above algorithm provides an adaptable, substantially real-time method for the detection of changes in a scene. Further the algorithm may be used for surveillance purposes, such as, but not limited to, manufacturing quality assessment, tracking of moving vehicles or other moving objects, periodic evaluations of medical examinations of the body, monitoring changes in terrestrial landscapes, intruder monitoring or lighting control for entrance areas of a home or business. Additionally, the algorithm may be used to monitor traffic congestion to perform intersection control, to assist in autonomous navigation, and other traffic conditions.

The techniques described in FIG. 5 may be implemented on a processor or any computer-readable media known in the art. A processor or computer-readable, as used and described in this disclosure, may include any computing device capable of executing instructions for receiving clinical information input from a caregiver. For example, the processor or computer-readable media may be a personal computer (e.g., a typical desktop or laptop computer operated by a user). In another embodiment, processor or computer-readable media may be a personal digital assistant (PDA) or other handheld computing device.

Alternatively, the processor or computer-readable media may be a networked device and may constitute a terminal device running software from a remote server, wired or wirelessly. Input from a caregiver or other system components, may be gathered through one or more known techniques such as a keyboard and/or mouse. Output, if necessary, may be achieved through one or more known techniques such as an output file, printer, facsimile, e-mail, web-posting, or the like. In other embodiments, the techniques described in FIG. 1 may be embodied internally or externally on a hard drive, ASIC, CD drive, DVD drive, tape drive, floppy drive, network drive, flash, or the like. Any type of monitor or screen known in the art, for displaying information, such as the templates may be coupled to the processor or computer-readable media. For example, a cathode ray tube (CRT) or liquid crystal display (LCD) can be used. One or more display panels may also constitute a display. In other embodiments, a traditional display may not be required, and processor the processor or computer-readable media may operate through appropriate voice and/or key commands.

EXAMPLES

The following examples are included to demonstrate specific embodiments of this disclosure. It should be appreciated by those with ordinary skill in the art that the techniques disclosed in the examples that follow represent techniques discovered by the inventors to function well in the practice of the invention, and thus can be considered to constitute specific modes for its practice. However, those with ordinary skill in the art should, in light of the present disclosure, appreciate that many changes can be made in the specific embodiments which are disclosed and still obtain a like or similar result without departing from the spirit and scope of the invention.

Figure 6:
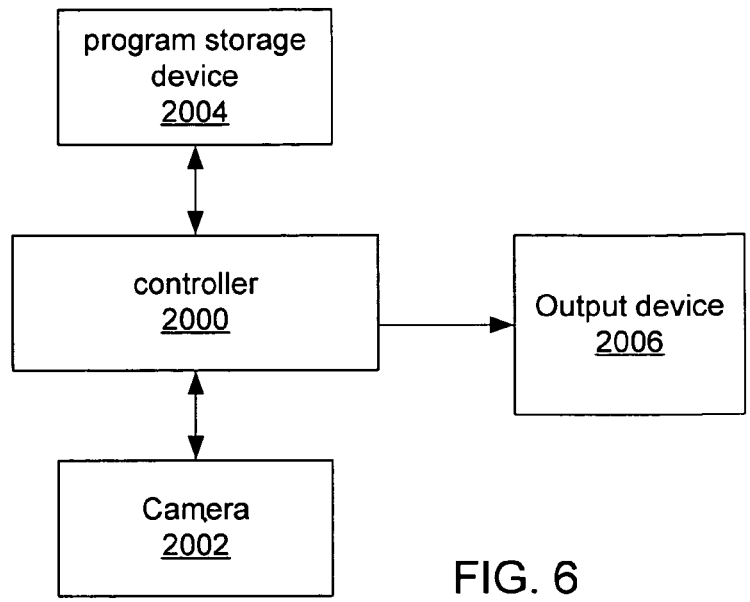
FIG. 6 is a block diagram of a system, in accordance to embodiments of the present disclosure.

Referring to FIG. 6, a system including a camera 2002, a controller 2000, and a program storage device 2004 is shown. In some embodiments, the controller 2000 may be a programmable circuit, such as a microprocessor or a digital signal processor-based circuit, that operates in accordance with instructions stored in program storage device 2004. For example, a MATLAB software program stored in programmable storage device 2004 and executed on controller 2000 may be utilized to implement an inspection approach based on the algorithm of the present disclosure for assessing the quality of printed circuit boards. Program storage device 2004 may be any type of readable memory including, but not limited to, a magnetic or optical media such as a card, tape, or disk, or a semiconductor memory such as a PROM or FLASH memory. The system may also include an output device 2006 such as a display or an output printing device for displaying the testing scene.

Example 1

Assessing Printed Circuit Boards

Figure 7:
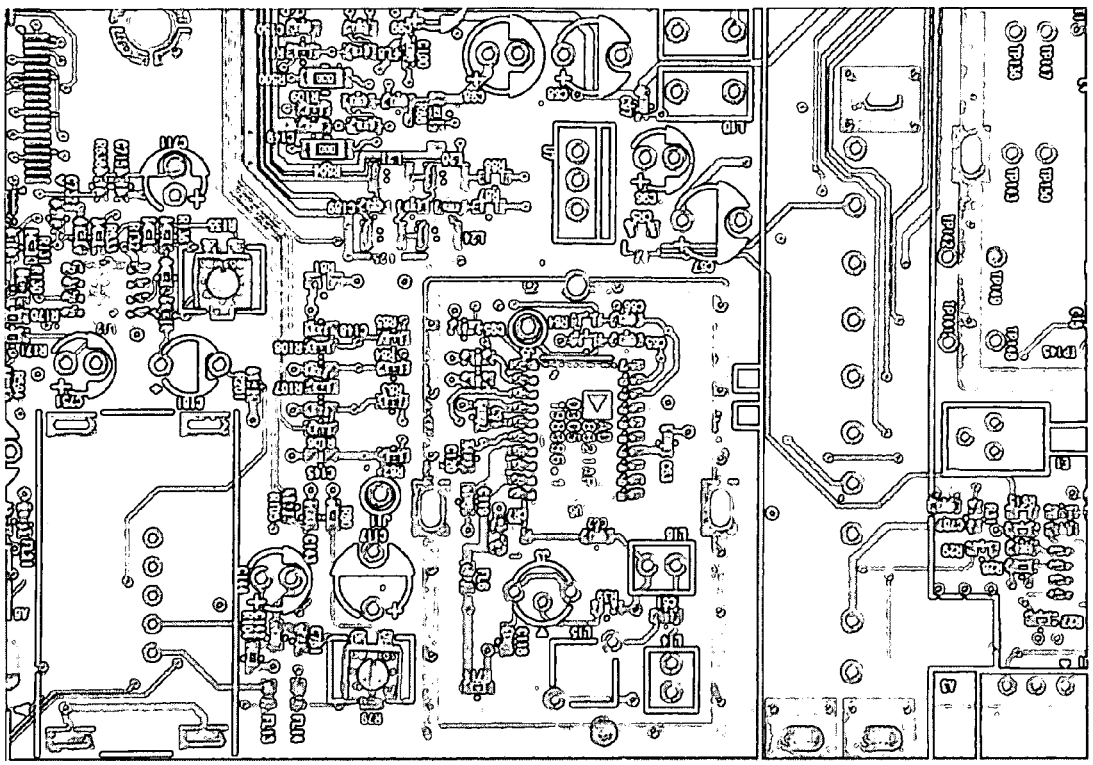
FIG. 7 shows a reference printed circuit board, in accordance to embodiments of the present disclosure.

The printed circuit board manufacturing application assumes a controlled environment, where a reference image, the image of the good circuit board, does not change and can be compared with circuit images from a set of boards under test. The effectiveness of the approach was assessed via the use of twelve digital images of boards obtained from a local firm. These images each contained 810×1152 pixels. These boards were inspected visually by humans and samples were selected such that six board images represented "good" samples and six "bad" samples. Two of the good board images were produced under reduced illumination conditions. The good board image selected as the reference is shown in FIG. 7.

Various algorithmic implementations may be used to assess the boards. These images could be assessed in whole using the algorithm of FIG. 5. These images may be processed in pieces via a scanning or arrayed version of the algorithm of FIG. 5. Further, as in the case below, these images may be processed after resizing the images to some convenient size.

Figure 9:
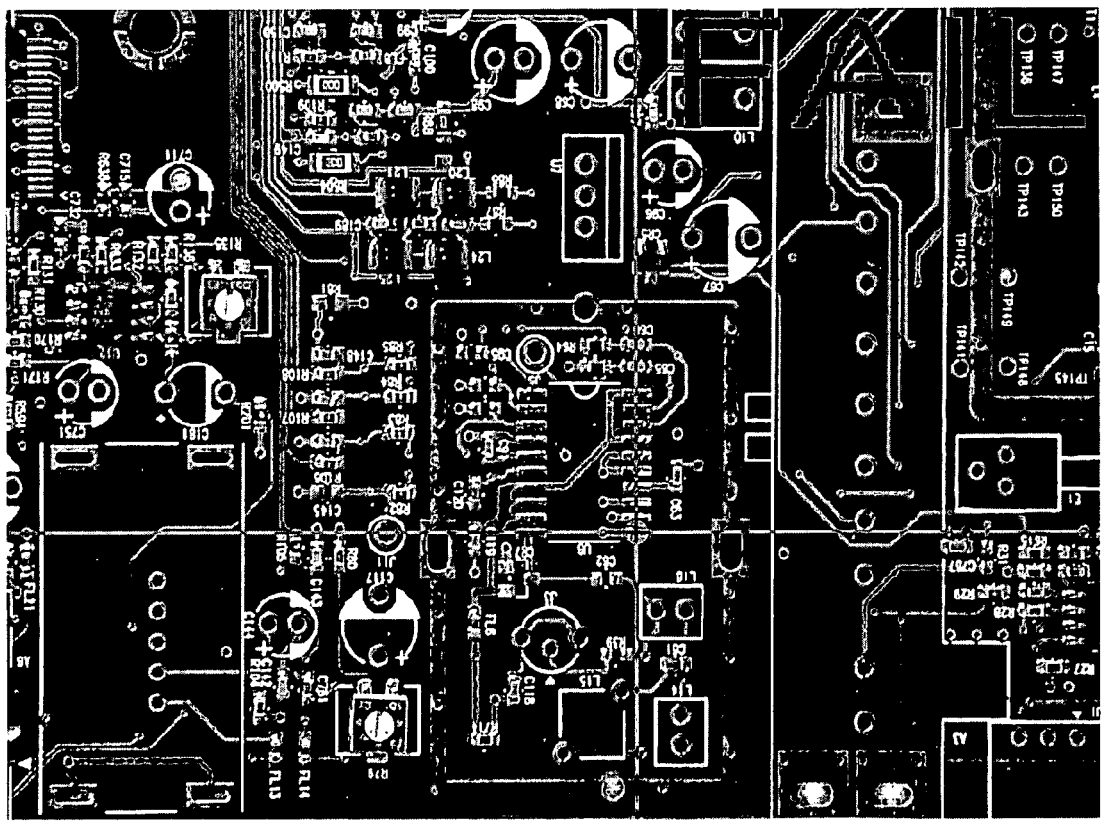
FIG. 9 shows a bad printed circuit board compared to the printed circuit board of FIG. 7, in accordance to embodiments of the present disclosure.
Figure 8:
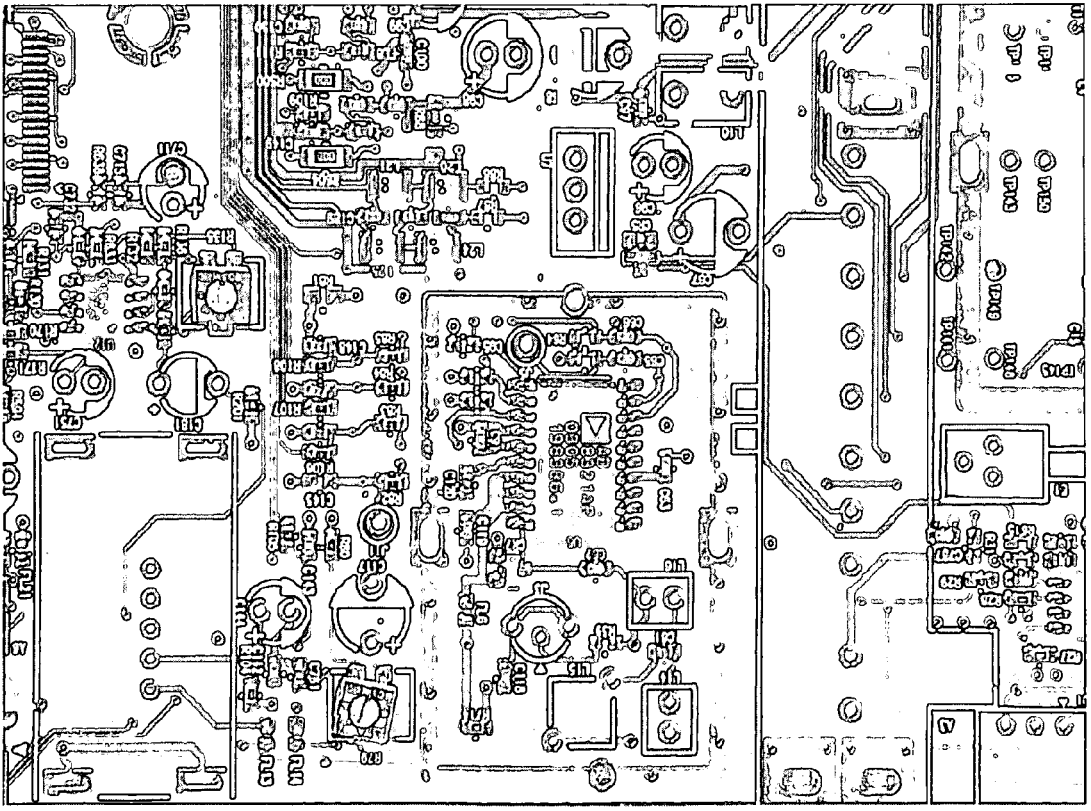
FIG. 8 shows a good printed circuit board compared to the printed circuit board of FIG. 7, in accordance to embodiments of the present disclosure.

After resizing of the images to a size of 256 by 256 pixels, the good and bad circuit board test images may be processed by the algorithm of FIG. 5, with N=256, C≧180, the distance between adjacent $h_m(i,j)$ filter centers equal to 64, and the fault thresholds set to declare a fault if the test image powers derived from Eqs. 1 through 3 differed from the reference image powers by more than about 0.5%. FIG. 8 and FIG. 9 show examples of the algorithm's output.

The algorithm's inspection results were in agreement with the visual inspection for ten of the test board images. The single image that produced a faulty result can be seen in FIG. 8. After inspection of this image that produced a false "good" result, it was determined that this board's defects were due to components that had shifted from their expected location by only slight amounts. Since the algorithm would be expected to produce some smoothing, this result is not unexpected. Further, this false result could be corrected by increasing image resolution, and possibly, via the use of different algorithm parameters.

In the cases where boards were identified as bad, the algorithm utilizes crosshair pointers to indicate the approximate location of identified faults. Since these board images are complex and can contain multiple faults, it is noted that pointers may not necessarily correspond to the center particular parts. Thus, the algorithm is not necessarily identifying changes in single components. However, single component assessment may also be added via a post-processing algorithm or a higher resolution version of the algorithm. Further, when a component is missing or misaligned, the algorithm may indicate that a component is missing or misaligned without indication of the area of the fault. Also, since the requirement here is to give the general area of faults that could then be intelligently assessed by a human inspector or further computer analysis, the exact association of individual faults is not necessary.

Example 2

Assessing Locations of Objects Near a Moving Vehicle

Assessments of the location of vehicles or other objects (i.e., moving objects or fixed objects) near a moving vehicle are a necessary aspect of avoiding collisions. The application assumes a non-controlled environment, where both the location of the objects in the scene and the background of the scene may change continuously. The effectiveness was assessed via the use of an arrayed version of the approach described in the present disclosure and a set of image sequences captured with a digital camera from a moving vehicle on a freeway. Each frame in the image sequence contained 320×240 pixels.

The freeway images may be processed after resizing the images to some other convenient size. The filter array may be created using a uniformly-distributed filter matrix containing 48 filters of the form of Eq. 3. The coefficient C may be selected such that a resulting 80×80 quad filter pixel areas may each contain four monotonically decreasing filters with nonzero values over an entire quad area. Further, change thresholds may be set to signal possible near vehicles or other objects if the current quad region powers, derived from. Eqs. 1 to 3, differ from the reference quad region powers by more than 0.5%. No special restrictions are placed on the selection of the reference image in any test case. It may simply be selected as the first image sampled in a particular video sequence. Thus, the reference may contain varying numbers of objects. It is noted that the reference image may be periodically updated.

Figure 10:
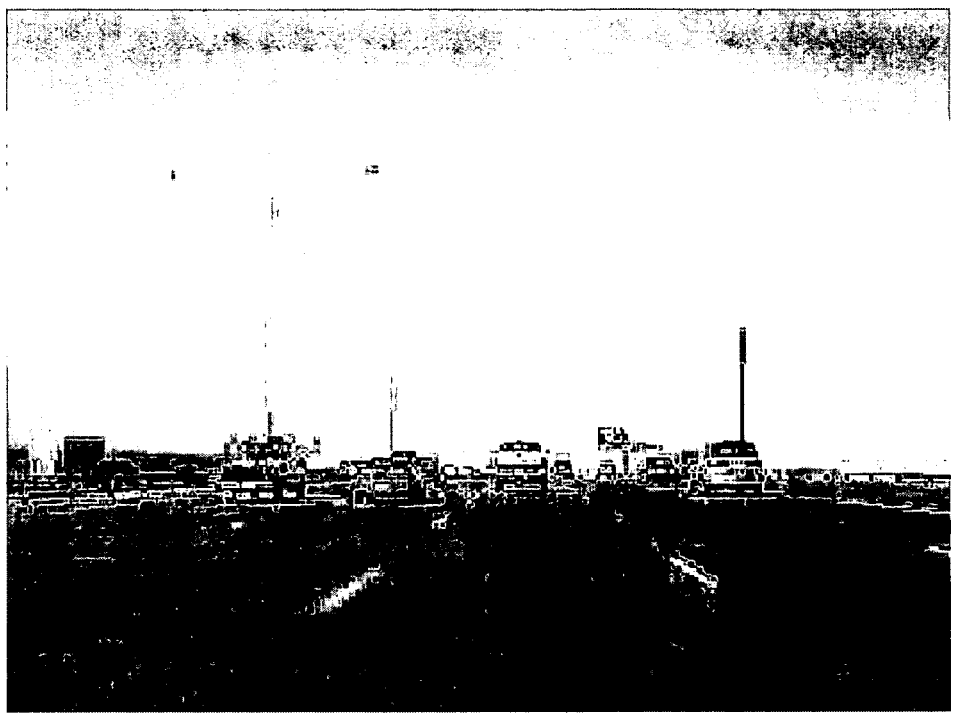
FIG. 10 shows a reference roadway scene, in accordance to embodiments of the present disclosure.
Figure 11:
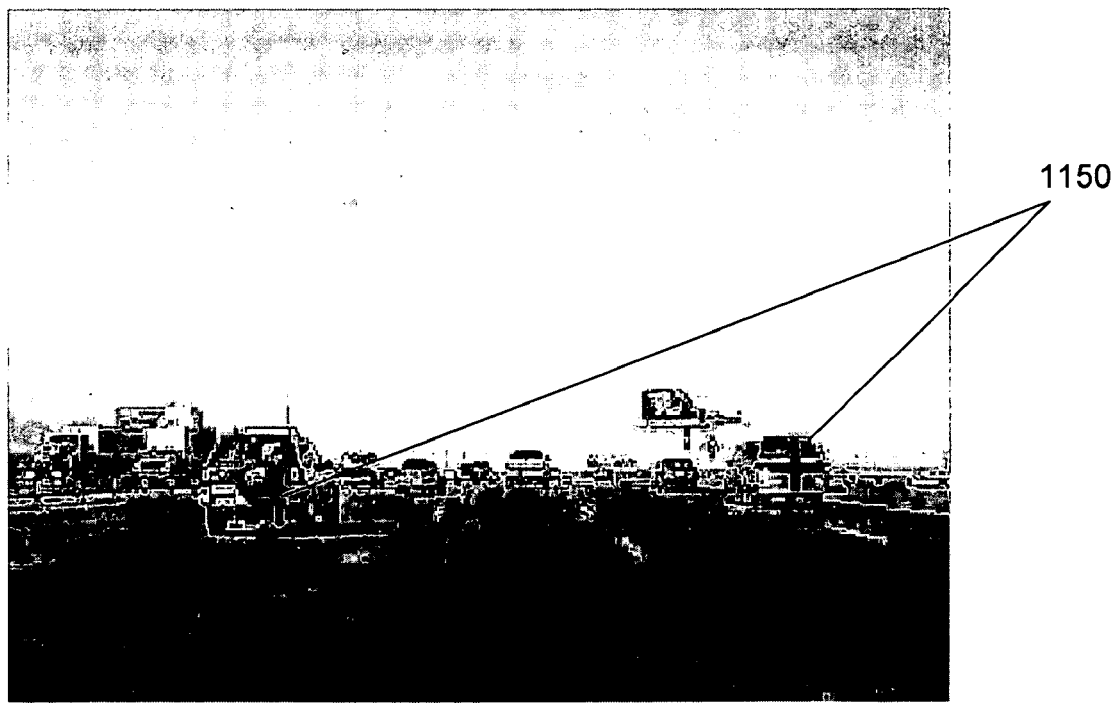
FIG. 11 shows a test scene compared to the reference scene of FIG. 10 and illustrates the detection of nearer vehicles, in accordance to embodiments of the present disclosure.

FIG. 10 shows an example of a reference scene and FIG. 11 shows a tagged scene (using, for example, pointers 1150) that may be produced as algorithm output. The algorithm may utilize crosshair pointers to indicate the approximate location of the regions where larger changes in scene power have been identified. In this application, the size of a power change may be indicative of nearness, since larger objects in the scene may cause larger changes in scene power. In some cases, these larger power changes may correspond to nearer vehicles or groups of merged vehicles. In other cases, stationary objects such as large roadway signs, billboards, or other large objects above the roadway may be tagged. Also, in some situations, shadows or stains on the road may similarly be tagged. Alternatively, merged combinations of the above may be tagged.

Vehicles and other objects that are small relative to the size of the scene may not be identified. In this case, the size of the object may be indicative of a distant object. Although, in some cases, multiple distant vehicles, other objects, or a combination of both, may be close to one another in the scene such that they may appear to merge and may be identified as well.

It is noted that the pointers given in this case may not necessarily correspond to the center of a true nearer vehicles or objects and that further post-processing with another algorithm may be required. Such, post-processing algorithms may be able to eliminate tagged clutter such as billboards, shadows, roadway stains, etc. However, for the purposes of this application, the identification of possible locations of nearer vehicles and objects may be sufficiently assistive in avoiding collisions, especially in combination with, for instance, a radar system and other algorithms.

* * * * *

All of the methods disclosed and claimed herein can be made and executed without undue experimentation in light of the present disclosure. While the apparatus and methods of this invention have been described in terms of preferred embodiments, it will be apparent to those of ordinary skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those ordinary skilled in the art are deemed to be within the spirit, scope, and concept of the invention as defined by the appended claims.

The invention claimed is:
1. A method, comprising:
electronically accessing a reference scene having a plurality of pixels;
electronically accessing a testing scene having a plurality of pixels; calculating a power indicative of the intensities of the pixels of the reference scene;
calculating a power indicative of the intensities of the pixels of the testing scene; and determining a difference between the power of the reference scene and the power of the testing scene;

where if the difference between the powers exceeds a threshold, the difference between the powers indicates a difference between the reference scene and the testing scene;

applying a plurality of non-concentric filters to the reference scene and the testing scene to calculate a plurality of filtered powers for each scene; and if a difference is detected between the reference scene and the testing scene, approximating the location of the difference by comparing the filtered powers of the reference scene and the testing scene.

2. The method of claim 1, where selecting a reference scene comprises selecting a manufactured item.

3. The method of claim 2, the manufactured item comprising a reference printed circuit board.

4. The method of claim 2, where selecting a testing scene comprises selecting a manufactured item.

5. The method of claim 4, the manufactured item comprising a printed circuit board to be tested.

6. The method of claim 1, where selecting a reference scene comprises selecting an image of an area for monitoring.

7. The method of claim 6, the area comprising a traffic intersection, a traffic bridge, a road, a building, a parking lot, a terrestrial area, an area of a sky, an area of an air space, an area of an outer space, or an area of a body.

8. The method of claim 6, where selecting a testing scene comprises selecting an image of an area for monitoring.

9. The method of claim 8, the area comprising a traffic intersection, a traffic bridge, a road, a building, a parking lot, a terrestrial area, an area of a sky, an area of an air space, an area of an outer space, or an area of a body.

10. The method of claim 1, further comprising providing the difference between the reference scene and the testing scene for human assessment.

11. The method of claim 1, further comprising providing the difference between the reference scene and the testing scene for computer analysis.

12. A computer program, comprising non-transitory computer or machine-readable program elements translatable for implementing the method of claim 1.

13. A method, comprising:
providing a processor configured for:
(a) electronically accessing a reference scene having a plurality of pixels;
(b) calculating a power indicative of the intensities of the pixels of the reference scene;
(c) electronically accessing a testing scene having a plurality of pixels;
(d) calculating a power indicative of the intensities of pixels of the testing scene; and
(e) determining a difference between the power of the reference scene and then power of the testing scene; and
(f) if the difference between the powers exceeds a threshold, registering a difference between the testing scene and the reference scene;
(g) applying a plurality of non-concentric filters to the reference scene and the testing scene to calculate a plurality of filtered powers for each scene; and
(h) if a difference is detected between the reference scene and the testing scene, approximating the location of the difference by comparing the filtered powers of the reference scene and the testing scene.

14. The method of claim 13, further comprising repeating steps (c) through (f).

15. The method of claim 13, where accessing a reference scene comprises receiving a reference object, and accessing a testing scene comprises receiving a testing object to be compared to the reference object.

16. The method of claim 15, where receiving a testing scene comprises receiving a testing object to be compared to the reference object.

17. The method of claim 13, where accessing a reference scene comprises receiving an image of a reference location.

18. The method of claim 17, where the reference location comprising a traffic intersection, a traffic bridge, a road, a building, a parking lot, a terrestrial area, an area of a sky, an area of an air space, an area of an outer space, and an area of a body.

19. The method of claim 13, the processor further comprising:
(g) providing the testing scene comprising the pointer for assessment.

20. The method of claim 13, where providing the testing scene comprises providing the testing scene for computer analysis.

21. The method of claim 13, where providing the testing scene comprises providing testing scene for human assessment.

22. The method of claim 13, where the processor is further configured for:
(i) providing the testing scene with a pointer indicative of the approximate location of the difference between the reference scene and the testing scene.

23. The method of claim 1, further comprising: displaying the testing scene with a pointer indicative of the approximate location of the difference between the reference scene and the testing scene.

* * * * *